(12) United States Patent
Kim et al.

(10) Patent No.: US 7,326,140 B2
(45) Date of Patent: Feb. 5, 2008

(54) POWER TRANSMITTING APPARATUS FOR HYBRID VEHICLE

(75) Inventors: Kyung Ha Kim, Yongin (KR); Wan Soo Kim, Hwaseong (KR); Yeon Ho Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 136 days.

(21) Appl. No.: 11/305,722

(22) Filed: Dec. 15, 2005

(65) Prior Publication Data

US 2007/0135255 A1   Jun. 14, 2007

(30) Foreign Application Priority Data

Dec. 9, 2005   (KR) ...................... 10-2005-0120951

(51) Int. Cl.
 *F16H 37/06*   (2006.01)
(52) U.S. Cl. .................... 475/5; 180/65.2; 180/65.4; 180/65.6; 384/571
(58) Field of Classification Search .................... None
 See application file for complete search history.

(56) References Cited

U.S. PATENT DOCUMENTS 4,813,297 A * 3/1989 Azuma et al. ................ 475/2

6,878,094 B2 * 4/2005 Kitamura et al. .............. 477/5
2002/0094898 A1 * 7/2002 Hata et al. ..................... 475/5

FOREIGN PATENT DOCUMENTS

| JP | 62-274160   | 11/1987 |
| JP | 07-0151141  | 6/1995  |
| JP | 08-091065   | 4/1996  |
| JP | 2000-127774 | 5/2000  |
| JP | 2001-354042 | 12/2001 |
| JP | 2004-144228 | 5/2004  |

* cited by examiner

*Primary Examiner*—David D. Le
(74) *Attorney, Agent, or Firm*—Morgan Lewis & Bockius LLP

(57) ABSTRACT

Durability of a planetary gear set can be enhanced and noise can be reduced by utilizing a power transmitting apparatus for a hybrid vehicle that supports a planetary gear set in an axial direction and a perpendicular direction. In addition, because a parking gear is disposed on a second shaft, torque can be minimized when the vehicle is parked on a slanted road.

8 Claims, 4 Drawing Sheets

POWER TRANSMITTING APPARATUS FOR HYBRID VEHICLE

CROSS-REFERENCE TO RELATED APPLICATION

This application claims priority to and the benefit of Korean Patent Application No. 10-2005-0120951 filed in the Korean Intellectual Property Office on Dec. 09, 2005, the entire contents of which are incorporated herein by reference.

BACKGROUND OF THE INVENTION (a) Field of the Invention

The present invention relates to a power transmitting apparatus for a hybrid vehicle.

More particularly, the present invention relates to a power transmitting apparatus that has enhanced durability and reduced noise, and in which a torque is reduced when the vehicle is parked on a slanted road.

(b) Description of the Related Art

Generally, a hybrid vehicle is an electric vehicle operated by utilizing an engine and a motor.

The hybrid vehicle uses power of the engine as a main power and uses power of an electric source (i.e., the motor) as an auxiliary power.

Therefore, the hybrid vehicle has a merit that it has a small ratio for transforming mechanical energy into electrical energy and has a high power transmitting efficiency.

As described, the power transmitting apparatus for a hybrid vehicle, as shown in FIG. 1, includes a first shaft 2, a planetary gear set PG, and second and third shafts 4 and 6.

The first shaft 2 receives power from the engine, and the planetary gear set PG is disposed to the first shaft 2.

A generator G and a motor M are respectively disposed to a front and a back of the planetary gear set PG and the power output from a ring gear R of the planetary gear set PG is transmitted to the second and third shafts 4 and 6.

Then, the power is finally transmitted to the wheels (not shown), down-shifted by the second and third shafts 4 and 6 and transmitted by a differential 8.

More particularly, a planet carrier PC of the planetary gear set PG is connected to the first shaft 2, a sun gear S is connected to the generator G, and the ring gear R is connected to the motor M and simultaneously connected to a drive sprocket 10.

The drive sprocket 10 transmits the power to the second shaft 4 through a driven sprocket 12 and a chain 14 of the second shaft 4.

A counter drive gear 16 of the second shaft 4 transmits the power by being engaged to a counter driven gear 18 of the third shaft 6.

A final gear 20 of the third shaft 6 is engaged to a differential gear 22 and transmits the power to a fourth shaft 24 through the differential 8 by finally down-shifting the power.

However, according to the power transmitting apparatus for the hybrid vehicle of the prior art, a load occurred from the drive sprocket 10 of the ring gear R of the planetary gear set PG in an axial direction and a perpendicular direction to the axial direction is not supported.

Therefore, problems occur that durability is deteriorated and noise is produced.

In particular, since the drive sprocket 10 is disposed in front of the planetary gear set PG by a connecting member 28 disposed to an end portion of a boss portion B of the ring gear R in a perpendicular direction to the shaft, in a case that the planetary gear set PG vibrates in the axial direction, a problem occurs that a supporting force of the connecting member 28 is weak.

In the back of the planetary gear set PG, a hub shaft HS connected with a rotor MR of the motor M and a connecting hub 52 of the ring gear R are simply connected in the perpendicular direction with each other.

Therefore, in a case that the planetary gear set PG vibrates in a perpendicular direction of the first shaft 2 a supporting force of the connecting hub 52 is weak, and therefore problems occur that durability of the planetary gear set PG is deteriorated and noise is produced.

In addition, because a parking gear 30 is disposed to the third shaft 6, in a case that the vehicle is parked on a slanted road a torque operated between the parking gear 30 and a sprag (not shown) is high.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a power transmitting apparatus having advantages of enhancing durability, reducing noise, and minimizing a torque in a case that a vehicle is parked on a slanted load.

An exemplary power transmitting apparatus for a hybrid vehicle according to an embodiment of the present invention includes: a first shaft receiving power from an engine; a planetary gear set disposed to the first shaft and including a sun gear, a planet carrier, and a ring gear; a generator and a motor respectively disposed to a front and a back of the planetary gear set; a second shaft receiving the power from the first shaft; a drive sprocket connected to the ring gear to transmit the power output from the ring gear and disposed to an exterior circumference of a boss portion of the ring gear to locate at the same plane as the ring gear; a driven sprocket disposed to the second shaft to receive the power from the first shaft; a chain connected to transmit the power from the drive sprocket to the driven sprocket; a third shaft receiving the power from the second shaft; a fourth shaft receiving a finally down-shifted power through a gear formed to the third shaft; an axial direction supporting portion disposed between a front end of the boss portion and a generator case to support the planetary gear set in an axial direction of the planetary gear set; and a two-directional supporting portion connected to support the planetary gear set in the axial direction and a perpendicular direction to the axial direction.

In a further embodiment, a parking gear may be disposed to a back of the driven sprocket.

The axial direction supporting portion is realized as a thrust ball bearing disposed between a case of the generator and an interior circumference of an elongated portion, the elongated portion formed by the front end of the boss portion of the ring gear being elongated in the axial direction.

Alternatively, the axial direction supporting portion is realized as a thrust ball bearing disposed between a case of the generator and an exterior circumference of an elongated portion, the elongated portion formed by the front end of the boss portion of the ring gear being elongated in the axial direction.

The two-direction supporting portion is realized as a double taper roller bearing engaged between an exterior circumference of a connecting hub connected to the ring gear and an exterior circumference of a motor case.

Alternatively, the two-direction supporting portion is realized as a double angular ball bearing engaged between an exterior circumference of a connecting hub connected to the ring gear and an exterior circumference of a motor case.

An exemplary power transmitting apparatus for a hybrid vehicle according to a first embodiment of the present invention includes: a first shaft receiving a power from an engine; a planetary gear set disposed to the first shaft and including a sun gear, a planet carrier, and a ring gear; a generator and a motor disposed to a front and a back of the planetary gear set; a second shaft receiving the power from the first shaft; a drive sprocket connected to the ring gear to transmit the power output from the ring gear and disposed to an exterior circumference of a boss portion of the ring gear to locate at the same plane as the ring gear; a driven sprocket disposed to the second shaft to receive the power from the first shaft; a chain connected to transmit the power from the drive sprocket to the driven sprocket; a third shaft receiving the power from the second shaft; a fourth shaft receiving a finally down-shifted power through a gear formed to the third shaft; a thrust ball bearing disposed between a case of the generator and an interior circumference of an elongated portion, the elongated portion formed by the front end of the boss portion of the ring gear being elongated in the axial direction, such that the thrust ball bearing supports the planetary gear set in an axial direction of the planetary gear set; and a double taper roller bearing engaged between an exterior circumference of a connecting hub connected to the ring gear and exterior circumference of a motor case, such that the double taper roller bearing supports the planetary gear set in the axial direction and a perpendicular direction to the axial direction.

In a further embodiment, a parking gear may be disposed to a back of the driven sprocket.

An exemplary power transmitting apparatus for a hybrid vehicle according to a second embodiment of the present invention includes: a first shaft receiving a power from an engine; a planetary gear set disposed to the first shaft and including a sun gear, a planet carrier, and a ring gear; a generator and a motor respectively disposed to a front and a back of the planetary gear set; a second shaft receiving the power from the first shaft; a drive sprocket connected to the ring gear to transmit the power output from the ring gear and disposed to an exterior circumference of a boss portion of the ring gear to locate at the same plane as the ring gear; a driven sprocket disposed to the second shaft to receive the power from the first shaft; a chain connected to transmit the power from the drive sprocket to the driven sprocket; a third shaft receiving the power from the second shaft; a fourth shaft receiving a finally down-shifted power through a gear formed to the third shaft; a thrust ball bearing disposed between a case of the generator and an exterior circumference of an elongated portion, the elongated portion formed by the front end of the boss portion of the ring gear being elongated in the axial direction, such that the thrust ball bearing supports the planetary gear set in an axial direction of the planetary gear set; and a double taper roller bearing engaged between an exterior circumference of a connecting hub connected to the ring gear and exterior circumference of a motor case, such that the double taper roller bearing supports the planetary gear set in the axial direction and a perpendicular direction to the axial direction.

In a further embodiment, a parking gear may be disposed to a back of the driven sprocket.

DETAILED DESCRIPTION OF THE EMBODIMENTS

Exemplary embodiments of the present invention will hereinafter be described in detail with reference to the accompanying drawings.

Figure 1:
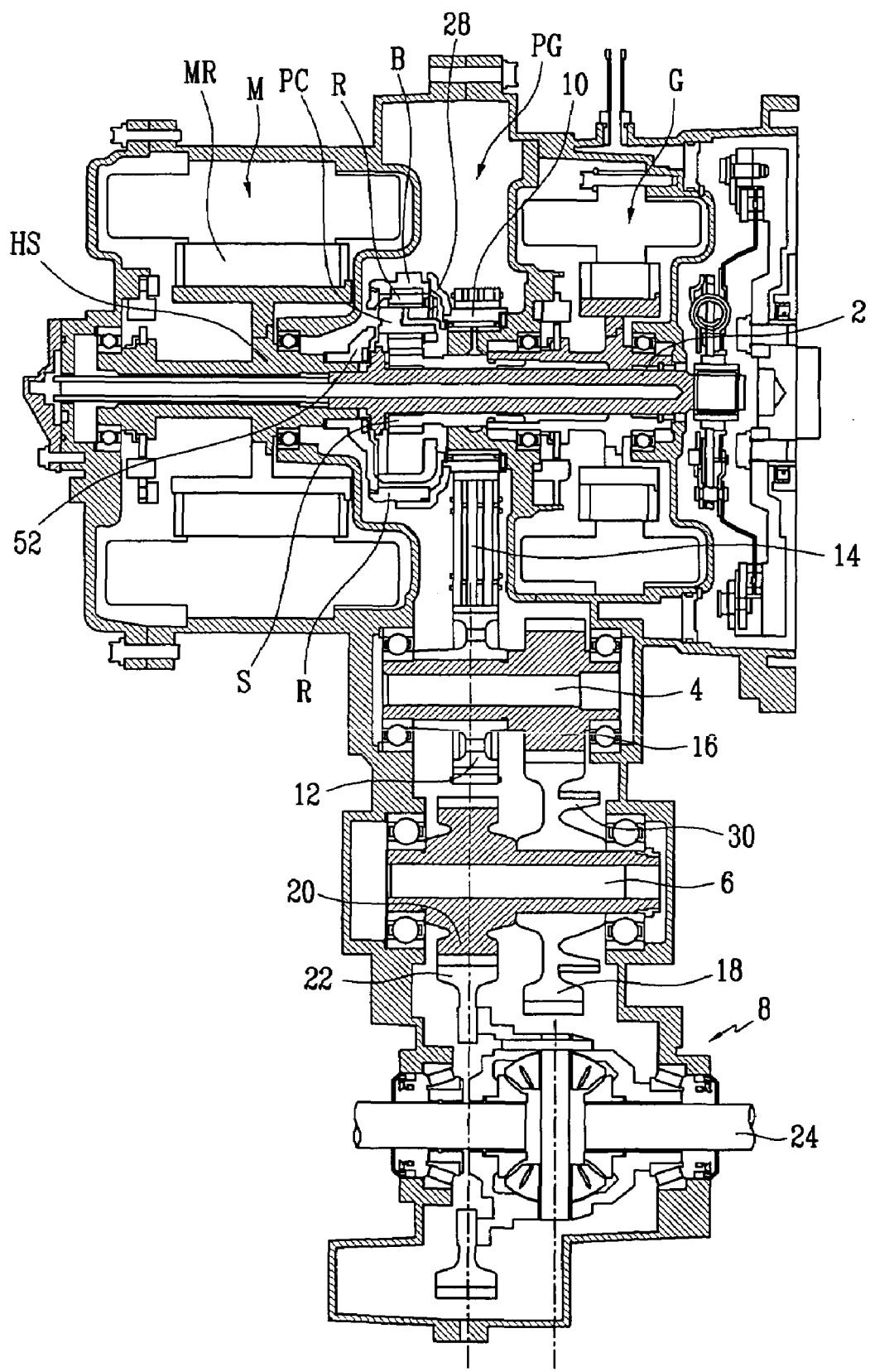
FIG. 1 is a cross-sectional view showing a power transmitting apparatus for a hybrid vehicle according to the prior art.
Figure 2:
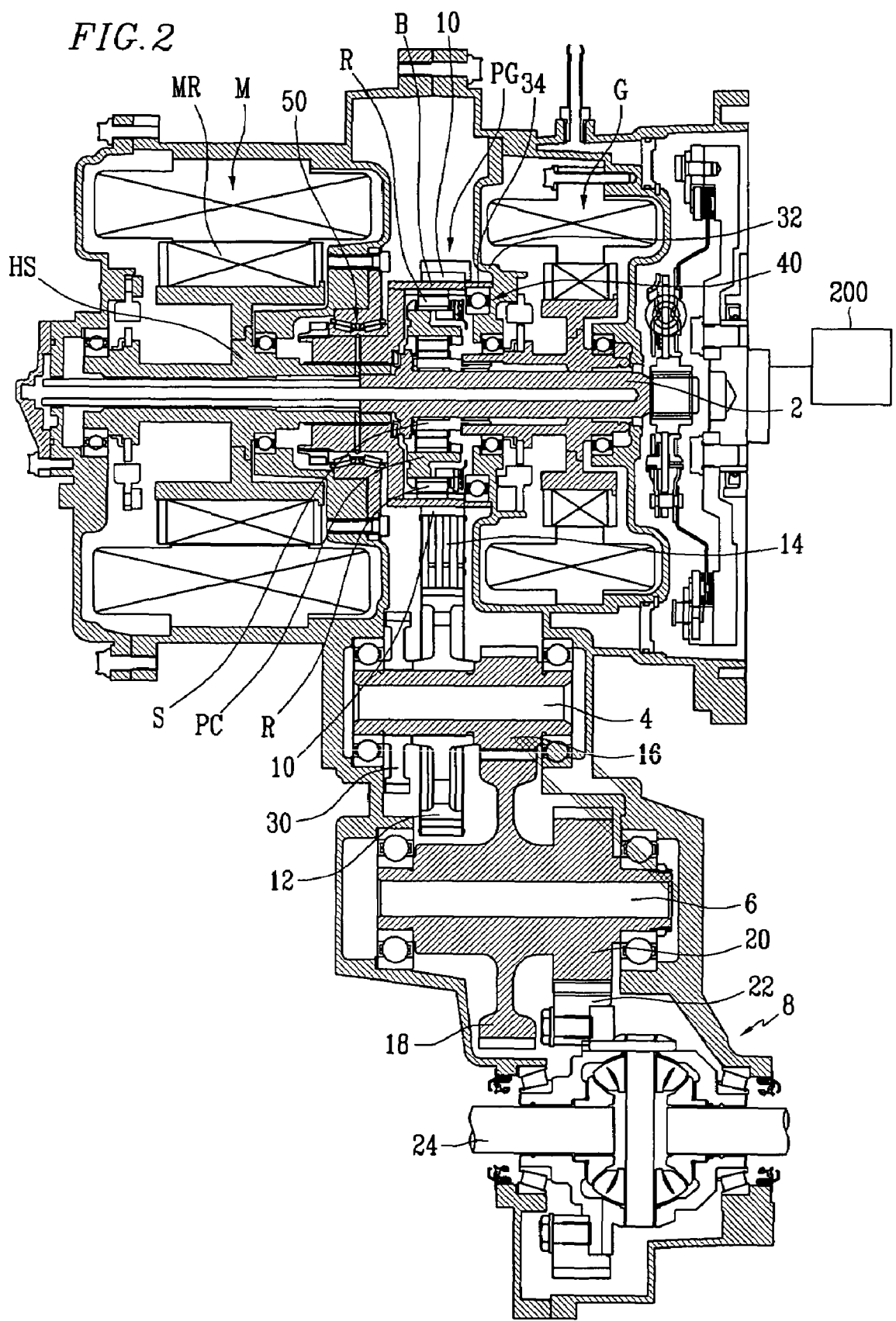
FIG. 2 is a cross-sectional view showing a power transmitting apparatus for a hybrid vehicle according to an exemplary embodiment of the present invention.
Figure 3:
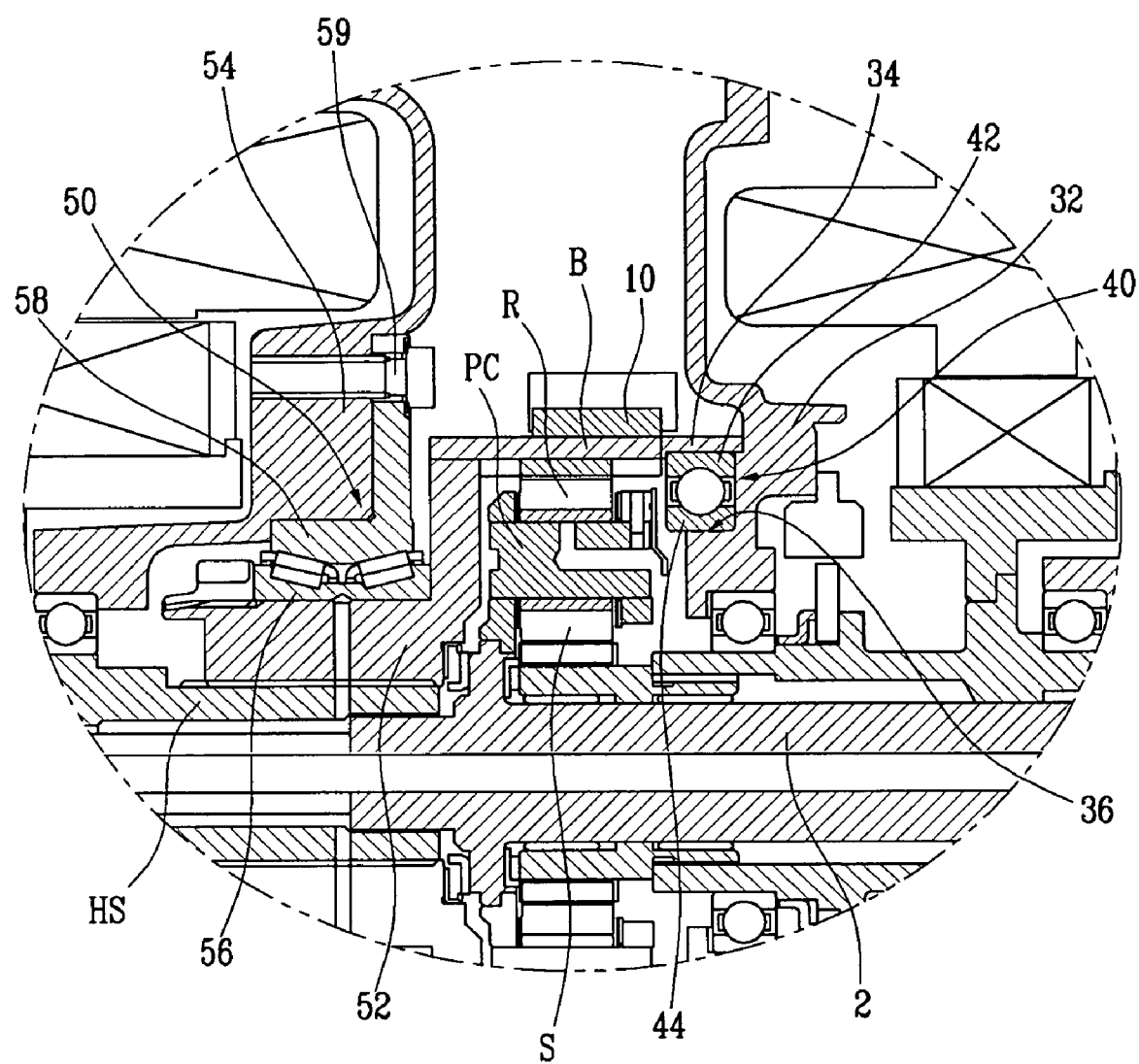
FIG. 3 is a cross-sectional view showing a main portion of the power transmitting apparatus for the hybrid vehicle according to a first exemplary embodiment of the present invention.

FIG. 2 is a cross-sectional view showing a power transmitting apparatus for a hybrid vehicle according to an exemplary embodiment of the present invention and FIG. 3 is a cross-sectional view showing a main portion of the power transmitting apparatus for the hybrid vehicle according to a first exemplary embodiment of the present invention.

According to the exemplary embodiment of the present invention, a power transmitting apparatus for a hybrid vehicle, as shown in FIG. 2, includes a first shaft 2, a planetary gear set PG, a generator G, a motor M, a drive sprocket 10, a driven sprocket 12, a chain 14, a third shaft 6, a fourth shaft 24, an axial direction supporting portion 40, and a two-directional supporting portion 50.

The first shaft 2 receives a power from an engine 200, and the planetary gear set PG is disposed to the first shaft 2 and includes a sun gear S, a planet carrier PC, and a ring gear R.

The generator G and the motor M are respectively disposed to a front and a back of the planetary gear set PG and the power output from the ring gear R of the planetary gear set PG is down-shifted by a gear formed to the second and third shafts 4 and 6 and is transmitted to the second and third shafts 4 and 6.

And then, the power is finally down-shifted and is transmitted to the wheels (not shown) through a differential 8.

More particularly, the planet carrier PC is connected to the first shaft 2, the sun gear S is connected to the generator G, and the ring gear R is connected to the motor M.

In addition, the ring gear R is located at the same perpendicular line as the drive sprocket 10 along an exterior circumference of a boss portion B of the ring gear R.

The drive sprocket 10 is disposed to the exterior circumference of the boss portion B of the ring gear R to locate at the same plane as the ring gear R.

The drive sprocket 10 is connected to the driven sprocket 12 disposed on the second shaft 4 by the chain 14.

Therefore, the power is transmitted from the first shaft 2 to the second shaft 4 and a counter drive gear 16 of the second shaft 4 transmits the power by being engaged with a counter driven gear 18 of the third shaft 6.

A final gear 20 of the third shaft 6 is engaged with the differential gear 22 and the power is down-shifted and is transmitted to the fourth shaft 24, which is a drive shaft through a differential 8.

The driven sprocket 12 is disposed to the second shaft 4 to receive the power from the first shaft 2.

In addition, in a back of the driven sprocket 12, a parking gear 30 is disposed on the second shaft 4.

In addition, as shown in FIG. 3, according to the first exemplary embodiment of the present invention, in a front of the planetary gear set PG, a thrust ball bearing 40, which is the axial direction supporting portion 40, is disposed between a front end of the boss portion B of the ring gear R and the generator case 32.

The thrust ball bearing 40 supports the planetary gear set PG in an axial direction.

Therefore, an axial direction vibration of the planetary gear set PG is prevented.

That is, the thrust ball bearing 40 is disposed between an elongated portion 34 of the boss portion B of the ring gear R and a perpendicular surface 36 of an exterior circumference of the generator case 32.

That is, an outer wheel 42 of the thrust ball bearing 40 is disposed to an interior circumference of the elongated portion 34 and an inner wheel 44 of the thrust ball bearing 40 is disposed to the perpendicular surface 36.

The two-directional supporting portion 50 supports the planetary gear set PG in an axial direction and a perpendicular direction to the axial direction.

That is, the two-directional supporting portion 50 is disposed in a back of the planetary gear set PG between a motor case 54 and a connecting hub 52 of the ring gear R, which is connected to a hub shaft HS connected to a rotor MR of the motor M.

The two-directional supporting portion 50 can be realized as a double taper roller bearing 50 and vibration in an axial direction and a perpendicular direction to the axial direction of the planetary gear set PG can be prevented by the two-directional supporting portion 50.

That is, the double taper roller bearing 50 includes an inner wheel 56 and an outer wheel 58.

The inner wheel 56 of the double taper roller bearing 50 is disposed to an exterior circumference of a connecting hub 52 of the ring gear R and the outer wheel 58 of the double taper roller bearing 50 is engaged to one side of an outer surface of the motor case 54 by a bolt 59.

In this case, the double taper roller bearing 50 can be replaced by a double angular ball bearing (not shown).

Figure 4:
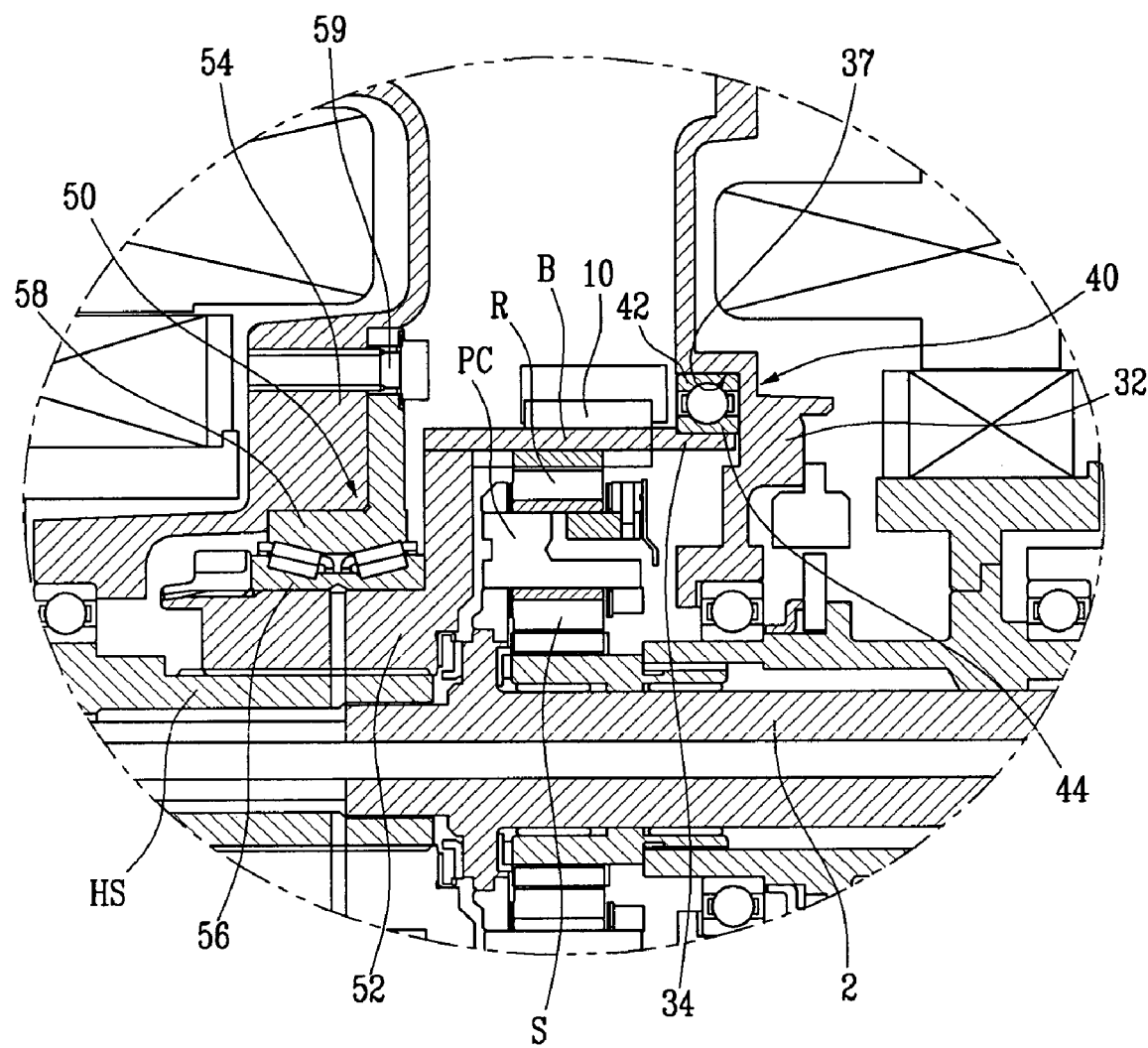
FIG. 4 is a cross-sectional view showing a main portion of the power transmitting apparatus for the hybrid vehicle according to a second exemplary embodiment of the present invention.

FIG. 4 is a cross-sectional view showing a main portion of the power transmitting apparatus for a hybrid vehicle according to a second exemplary embodiment of the present invention.

As shown in FIG. 4, according to the second exemplary embodiment of the present invention, an axial direction supporting portion 40 can be disposed between the elongated portion 34 and a perpendicular surface 37 of an exterior circumference of the generator case 32.

Therefore, according to the power transmitting apparatus for a hybrid vehicle of the exemplary embodiment of the present invention, vibration occurred in a ring gear R of a planetary gear set PG and a drive sprocket 10, occurring in either an axial direction or a perpendicular direction to the axial direction, can be prevented.

Therefore, durability of the planetary gear set PG can be enhanced and noise caused by the vibration can be reduced.

In addition, according to the exemplary embodiments of the present invention, a parking gear 30 of the power transmitting apparatus for the hybrid vehicle is disposed to the second shaft 4 of a down-shift gear portion.

Therefore, in a case that the vehicle is parked on a slanted road, or the like, torque transmitted from the wheels can be reduced.

That is, since the parking gear is disposed on the second shaft of the down-shift gear portion, in a case that the vehicle is parked on the slanted road, the torque operating between a parking gear and a sprag can be minimized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power transmitting apparatus for a hybrid vehicle, comprising:
   a first shaft receiving a power from an engine;
   a planetary gear set disposed to the first shaft and including a sun gear, a planet carrier, and a ring gear;
   a generator and a motor respectively disposed to a front and a back of the planetary gear set;
   a second shaft receiving the power from the first shaft;
   a drive sprocket connected to the ring gear to transmit the power output from the ring gear and disposed to an exterior circumference of a boss portion of the ring gear to locate at the same plane as the ring gear;
   a driven sprocket disposed to the second shaft to receive the power from the first shaft;
   a chain connected to transmit the power from the drive sprocket to the driven sprocket;
   a third shaft receiving the power from the second shaft;
   a fourth shaft receiving a finally down-shifted power through a gear formed to the third shaft;
   an axial direction supporting portion disposed between a front end of the boss portion and a generator case to support the planetary gear set in an axial direction of the planetary gear set, wherein the axial direction supporting portion is realized as a thrust ball bearing disposed between the case of the generator and an interior circumference of an elongated portion, the elongated portion formed by the front end of the boss portion of the ring gear being elongated in the axial direction; and
   a two-directional supporting portion connected to support the planetary gear set in the axial direction and a perpendicular direction to the axial direction.

2. The apparatus of claim 1, wherein a parking gear is disposed to a back of the driven sprocket.

3. The apparatus of claim 1, wherein the two-direction supporting portion is realized as a double taper roller bearing engaged between an exterior circumference of a connecting hub connected to the ring gear and an exterior circumference of a motor case.

4. The apparatus of claim 1, wherein the two-direction supporting portion is realized as a double angular ball bearing engaged between an exterior circumference of a connecting hub connected to the ring gear and an exterior circumference of a motor case.

5. A power transmitting apparatus for a hybrid vehicle, comprising:
   a first shaft receiving a power from an engine;
   a planetary gear set disposed to the first shaft and including a sun gear, a planet carrier, and a ring gear;
   a generator and a motor respectively disposed to a front and a back of the planetary gear set;
   a second shaft receiving the power from the first shaft;

a drive sprocket connected to the ring gear to transmit the power output from the ring gear and disposed to an exterior circumference of a boss portion of the ring gear to locate at the same plane as the ring gear;

a driven sprocket disposed to the second shaft to receive the power from the first shaft;

a chain connected to transmit the power from the drive sprocket to the driven sprocket;

a third shaft receiving the power from the second shaft;

a fourth shaft receiving a finally down-shifted power through a gear formed to the third shaft;

a thrust ball bearing disposed between a case of the generator and an exterior circumference of an elongated portion, the elongated portion formed by the front end of the boss portion of the ring gear being elongated in the axial direction, such that the thrust ball bearing supports the planetary gear set in an axial direction of the planetary gear set; and a double taper roller bearing engaged between an exterior circumference of a connecting hub connected to the ring gear and an exterior circumference of a motor case, such that the double taper roller bearing supports the planetary gear set in the axial direction and a perpendicular direction to the axial direction.

6. The apparatus of claim 5, wherein a parking gear is disposed to a back of the driven sprocket.

7. A power transmitting apparatus for a hybrid vehicle, comprising:

a first shaft receiving a power from an engine;

a planetary gear set disposed to the first shaft and including a sun gear, a planet carrier, and a ring gear;

a generator and a motor respectively disposed to a front and a back of the planetary gear set;

a second shaft receiving the power from the first shaft;

a drive sprocket connected to the ring gear to transmit the power output from the ring gear and disposed to an exterior circumference of a boss portion of the ring gear to locate at the same plane as the ring gear;

a driven sprocket disposed to the second shaft to receive the power from the first shaft;

a chain connected to transmit the power from the drive sprocket to the driven sprocket;

a third shaft receiving the power from the second shaft;

a fourth shaft receiving a finally down-shifted power through a gear formed to the third shaft;

a thrust ball bearing disposed between a case of the generator and an interior circumference of an elongated portion, the elongated portion formed by the front end of the boss portion of the ring gear being elongated in the axial direction, such that the thrust ball bearing supports the planetary gear set in an axial direction of the planetary gear set; and a double taper roller bearing engaged between an exterior circumference of a connecting hub connected to the ring gear and an exterior circumference of a motor case, such that the double taper roller bearing supports the planetary gear set in the axial direction and a perpendicular direction of the axial direction.

8. The apparatus of claim 7, wherein a parking gear is disposed to a back of the driven sprocket.

* * * * *